Nov. 30, 1937.    G. WÜNSCH    2,100,706
ALTITUDE MEASURING APPARATUS
Filed Nov. 27, 1933    4 Sheets-Sheet 4

Inventor:
Guido Wünsch
by Edward H. Pohne
Atty.

Patented Nov. 30, 1937

2,100,706

UNITED STATES PATENT OFFICE 2,100,706

ALTITUDE MEASURING APPARATUS

Guido Wünsch, Berlin-Steglitz, Germany, assignor to Askania-Werke A. G. vormals Centralwerkstatt-Dessau und Carl Bamberg-Friedenau, a corporation of Germany Application November 27, 1933, Serial No. 699,941
In Germany November 26, 1932

7 Claims. (Cl. 73—4)

(Granted under the provisions of sec. 14, act of March 2, 1927; 357 O. G. 5)

This invention relates to altitude measuring and/or indicating apparatus, more particularly for use on aircraft.

Barometrical altitude measuring apparatus have proven unreliable and unsafe, particularly when landing in foggy, misty, rainy or snowy weather or when for any other reason the visibility is poor, because the atmospheric pressure varies from time to time and also with the locality, so that indications of the altitude of an aircraft by such apparatus are at best only approximately correct.

To remedy this disadvantage it has been proposed to use sounding apparatus of the echo-measuring type, which determine altitude by the time which a wave train, preferably a sound wave train, sent out from the aircraft and reflected from the ground takes to reach the ground and return to the aircraft. In landing, for example, such sounding apparatus is used in conjunction with a barometrical altimeter, the altitude indications of said sounding apparatus being used to correct those of the barometrical altimeter. Such an arrangement, however, is open to the very serious objection that to make such correction of the barometrical altimeter the pilot is obliged to divide his activity and attention, at the very moment when he should devote his entire attention and skill to effecting a safe landing. Furthermore it will be readily seen that some time must necessarily elapse between the time of making the sounding apparatus reading and that of correcting the barometrical altimeter to correspond thereto. However short such time may be, the aircraft will meanwhile have changed its altitude by several meters, thereby injecting a further source of error into the determination of the altitude.

The present invention has for its object among other things, to overcome these and other objections to the methods heretofore used and to provide apparatus that shall give the correct altitude at any and all times, and this by so combining suitable altitude measuring means or other means responsive to changes in atmospheric pressure, with a sounding apparatus of the echo-measuring type, for example, that both of said apparatus can control or operate a common altitude indicator means. Any suitable sounding apparatus of the general type referred to may be used in accordance with my invention, but I preferably use that type comprising a time measuring device running at constant speed, and in which an index or pointer is set in motion when a wave train, preferably a sound wave train is sent out and would normally be arrested by action of the returning echo wave, so that from the distance covered by said index or pointer the echo period, and hence the correct altitude above the ground can be determined.

In carrying out my invention, however, the movement of said index or pointer is not arrested by the action of the returning echo wave, but is connected to the operating mechanism or driving gear of the means responsive to changes in atmospheric pressure, so that, upon completion of the altitude measurement by said sounding apparatus, said index or pointer of the time measuring device of said sounding apparatus will be controlled or moved by the mechanism of said means responsive to changes in atmospheric pressure, the latter thus giving all further altitude indications thereafter. As said means responsive to changes in atmospheric pressure has then been automatically corrected by said echo measurement, for the atmospheric pressure actually existing at the landing place, the apparatus embodying my invention will at all times indicate correct altitudes at the place of landing, thus relieving the pilot from the necessity of giving his attention to anything other than that of landing.

While any suitable means responsive to changes in atmospheric pressure may be used within the scope of my invention, I preferably use one having an aneroid-like operating mechanism, and if it operates with diaphragm chambers, this is made possible by connecting the interior of said diaphragm chambers with a container of greater capacity which can at will be caused to communicate with or cut off from the atmosphere by a valve, or other suitable means. The echo measuring means having been set in operation on emission of a wave train, said valve will be closed at the instant said echo measuring means receives the return train of waves. Thereupon said diaphragm chambers will respond to any variation of the atmospheric pressure from that which obtained at the time said wave train was emitted, so that by using a scale having divisions in terms of altitude, the pointer or index of said time measuring device, being connected to the mechanisms of said barometrical altimeter by action of the returning wave train, will indicate real altitudes upon said scale.

The invention and its aims and objects will be readily understood from the following description, taken in connection with the accompanying drawings, of two embodiments of the invention, herein given for illustrative purposes, the true scope of the invention being pointed out in the appended claims.

Figure 1:
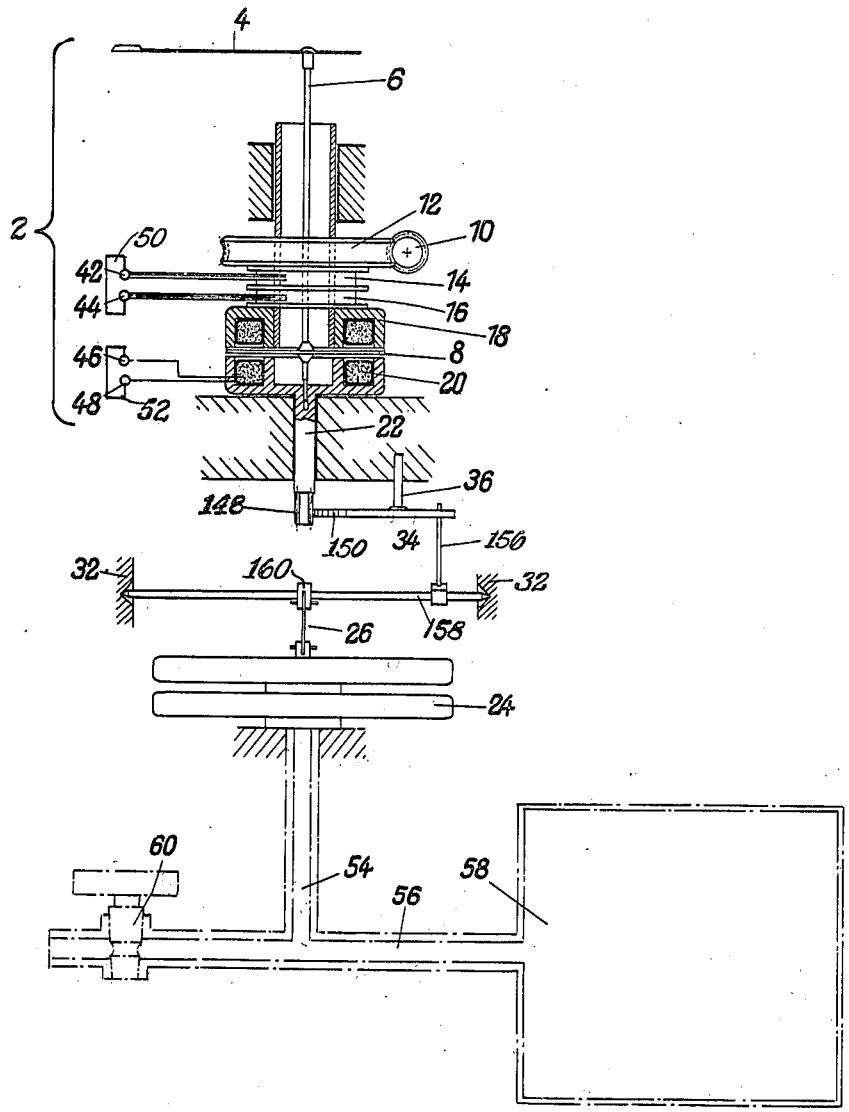
Fig. 1 is a diagrammatic representation of one illustrative embodiment of the invention, certain parts being shown in section.

Referring to Fig. 1, an echo measuring device of conventional construction and its time measuring device running at constant speed are diagrammatically represented at 2. 4 is the index or pointer of said time measuring device, said index or pointer being mounted upon a shaft 6 which carries an iron disk 8. A worm 10, driven by any suitable driving means, for example by a regulated electric motor (not shown), meshes with a worm wheel 12. Said shaft 6 is freely rotatable in its bearings. Said worm wheel 12 is rigidly connected to slip-rings 14 and 16 and to a pot-shaped electro-magnet 18 and is rotatable with these about said shaft 6 but independently of said shaft. A further electro-magnet 20 also preferably pot-shaped, is in alignment with said magnet 18, said disk 8 being between said two magnets. Said second magnet 20 is fast upon the upper end of the driving shaft 22 of the means responsive to changes in atmospheric pressure, which comprises essentially a diaphragm chamber system 24, herein comprising for example two diaphragm chambers, of which the diaphragms communicate their movements through a link 26 and an arm 160 to a shaft 158 mounted in bearings 32, 32. The rotary movement communicated to the shaft 158 is transmitted to the shaft 22 through an arm 156 secured at one end upon the shaft 158, the other end of said arm 156 acting upon one end of a lever 34 fulcrumed at 36 and having its other end provided with a toothed segment 158 which engages a gear 148 fast upon the end of said shaft 22. Energizing current is supplied to the magnet 18 through contacts 42, 44 engaging rings 14 and 16 and to magnet 20 through conductors 46, 48. Said energizing current will be supplied from any suitable source not shown.

The above described embodiment operates as follows:

The pointer 4 remains at 0 until an exact echo measurement is to be made. When this is to be done the operating mechanism of the echo measuring means is set in operation and when the wave train is emitted the circuit comprising contacts 42 and 44 will be closed by suitable means diagrammatically shown at 50, thus supplying the magnet 18 with current, so that the said magnet attracts the disk 8 fast on said shaft 6 and causes it and said shaft 6 to rotate therewith at constant speed, thus moving the index 4 over the scale. The returning wave train closes the circuit of the magnet 20 comprising conductors 46 and 48 by the operation of suitable means diagrammatically indicated at 52, so that the magnet 20 being now energized attracts the disk 8. As said magnet 20 is carried by the driving shaft 22 of the means responsive to changes in atmospheric pressure, said index 4 from this time on will be controlled or moved by operation of the diaphragm chambers 24, through the mechanism above described. As said index had been previously adjusted by the operation of the echo measuring means to indicate the correct altitude of the aircraft above the ground, said index in its continued movement from now on will indicate corrected altitudes, assuming that the transmission ratio of said means responsive to changes in atmospheric pressure has been so selected that the altitude divisions of the echo measuring means and those of said means responsive to changes in atmospheric pressure correspond.

The interior of the diaphragm chambers 24 communicates preferably by means of pipes 54 and 56 with the interior of a container 58, the interior capacity of which is relatively large as compared to the interior capacity of said diaphragm chambers. A valve 60 provided in the pipe 56 serves to close off communication of the container 58 with atmosphere or to establish such communication. Preferably said valve 60 will remain open when the apparatus is not in use, and closed only at the instant the echo measurement is effected. The diaphragm chambers then operate according to the difference existing from time to time between the atmospheric pressure and that atmospheric pressure which obtained at that point where the aircraft was at the moment that the echo measurement was made.

Figure 2:
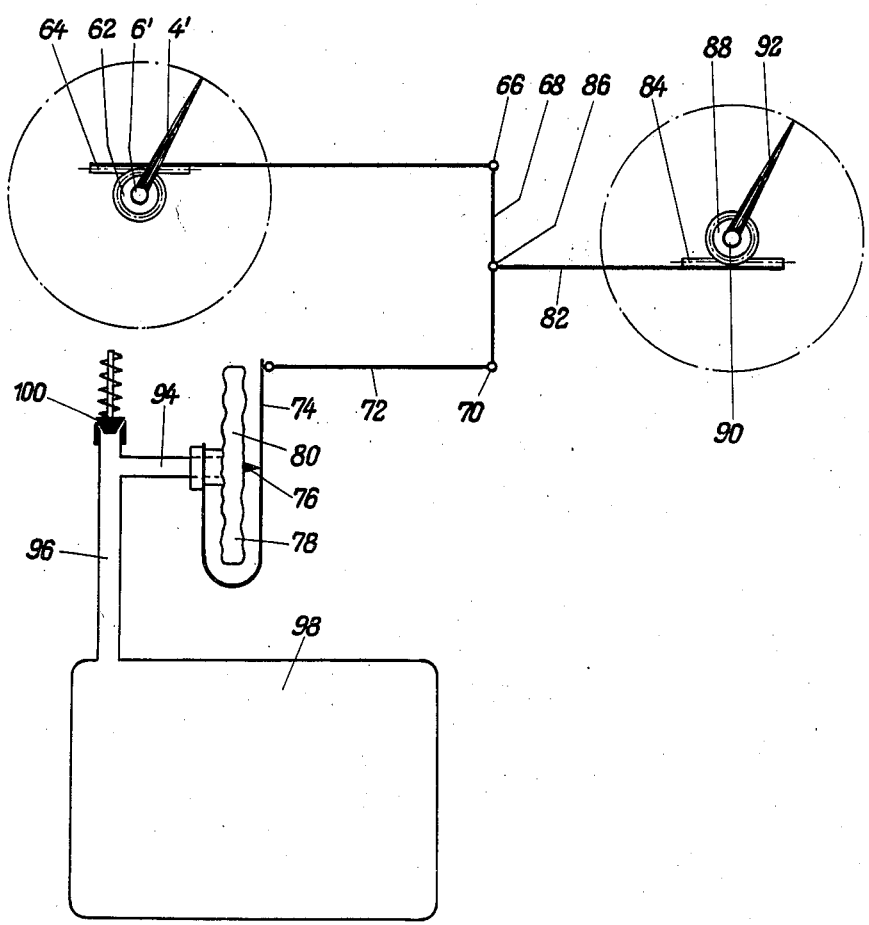
Fig. 2 shows diagrammatically another illustrative embodiment of the invention, certain parts being represented in section.

Referring to Fig. 2, in the illustrative embodiment of the invention therein shown, the echo measuring means and diaphragm chamber of the means responsive to changes in atmospheric pressure act through a differential drive. To this end, the shaft 6' of the time-measuring device of the echo measuring means carries besides the pointer 4' or in addition to the latter, a gear 62 which meshes with a rack 64. Said rack 64 is pivotally connected at 66 to one end of a lever 68, the other end 70 of which is pivotally connected to one end of a link 72. The other end of said link 72 is acted upon by a spring member 74 which is moved through a contact member 76 acted upon by movment of the diaphragm 78 of a diaphragm chamber 80 of the means responsive to changes in atmospheric pressure. A link 82 connects a rack 84 with the center 86 of said lever 68. Said rack 84 meshes with a gear 88 secured upon the shaft 90 which carries the index or pointer 92 of an altitude indicating means. The interior of a container 98 communicates with the interior of said diaphragm chamber 80 through pipes 94 and 96. A valve 100 serves to establish or interrupt communication of said container 98 with atmosphere.

So long as the valve 100 remains open and the time measuring device of the echo measuring device is at rest no movement will be imparted to the lever mechanism above described nor to the index 92. If the time measuring device be now set in operation by emission of a wave train, then said rack 64 will be moved in the one or the other direction, say for example to the right, thus displacing the pivotal point 66 also to the right. This swings the lever 68 about its fulcrum 70, thus moving the link 82 and rack 84 to the right and turning the index 92 through an angle corresponding to the altitude measured by the echo.

The returning echo wave arrests the time measuring device means running at constant speed as diagrammatically indicated, and therefore also arrests the rack 64. Upon closure of the valve 100, the diaphragm chamber 80 alone acts upon the lever 68 through link 72, said lever being now swung about the fulcrum 66. From now on, therefore, the means responsive to changes in atmospheric pressure alone controls movement or adjustment of the pointer 92, so that the latter indicates altitudes corrected automatically by the echo measuring means.

Figure 3:
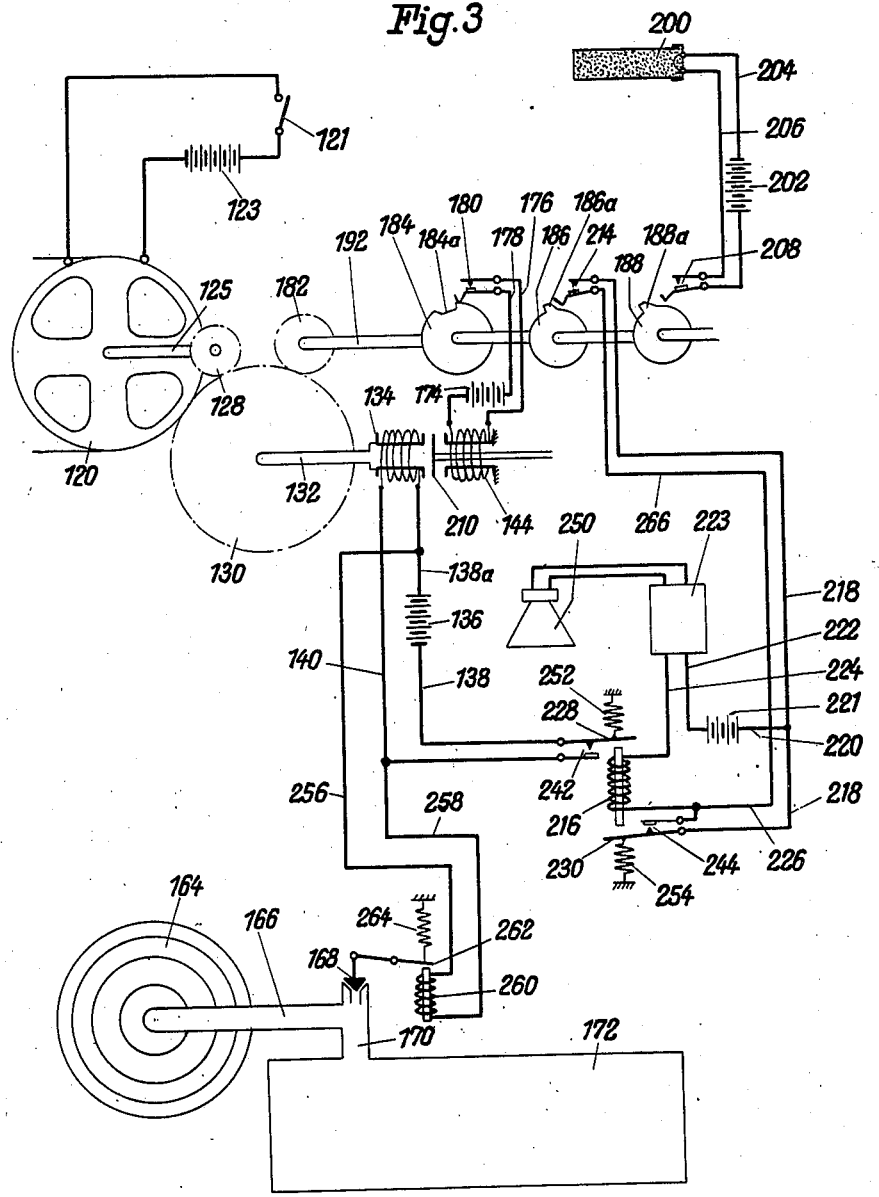
Fig. 3 shows in greater detail the structure only diagrammatically illustrated in Fig. 1.
Figure 4:
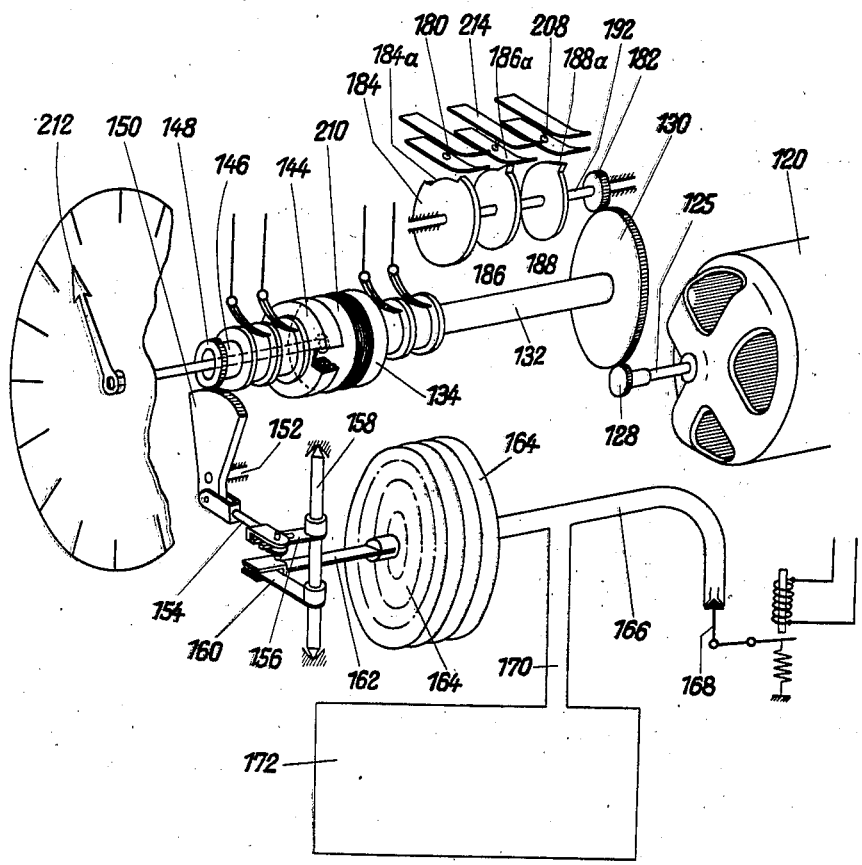
Fig. 4 is a perspective view of the parts shown in Fig. 3.

Referring to Fig. 3, 120 is the driving motor operated from a suitable source of electrical energy 123 upon closure of hand switch 121. A gear 128 on the motor shaft 125 meshes with a larger gear 130, which is rigidly mounted on shaft 132 together with a pot-shaped electromagnet 134, said shaft 132 being driven so as to revolve at constant speed. Said electromagnet 134 receives its current from battery 136 over line 138, 140 upon closure of relay switch 242. In front of said electromagnet 134 is placed a further electromagnet 144, also pot-shaped and rigidly keyed on a hollow shaft 146 shown in Fig. 4. This hollow shaft 146 carries a gear 148 which meshes with a toothed segment 150 rotatable upon a shaft 152 and connected with shaft 158 by levers 154, 156. Said shaft 158 is connected with diaphragm chambers 164 of the barometrical altimeter by a lever 160 and link 162. The interior of said diaphragm chambers 164 communicates with the atmosphere by a pipe 166 through valve 168 and with a container 172 by a pipe 170.

The winding of magnet 144 is supplied with current from battery 174 over the lines 176, 178 when switch 180 is closed.

Said gear 130 meshes with a gear 182 rigidly keyed on shaft 192 with cam disks 184, 186, 188.

In explaining the operation of the invention with reference to diagrammatic Figures 1 and 2, it was shown that before setting in operation the apparatus, both magnets 18 and 20 are left currentless and that upon emission of an echo wave, magnet 18 is supplied with current, whereas the returning echo wave provides magnet 20 with current, at the same time breaking the circuit of magnet 18. In actual practice, however, such a simple switching would cause difficulties owing to the presence of remanent magnetism. It could happen that upon opening the circuit of magnet 18 and switching on current to magnet 20, the remanent magnetism in the iron of said magnet 18 would retard the shifting of the coupling of disk 8 from said magnet 18 to said magnet 20, thus giving rise to a false indication. In practice, therefore, a different method of connection is used which is commonly employed in echo sound meters; this method of connection comprises supplying both magnets with current shortly before the emission of a sound wave, the fixed magnet being first supplied and shortly thereafter the magnet connected to the motor. The iron disk connected with the pointer is consequently attracted by the fixed magnet and remains so attracted after the magnet on the motor shaft has been supplied with current. Simultaneously with the emission of the sound wave the current of the fixed magnet is switched off, thus practically simultaneously causing the magnet of the motor to attract said disk, so that simultaneously with the emission of the sound wave, the iron disk placed with the pointer on a common shaft, is caused to rotate by the motor. Immediately thereafter the second fixed magnet of the common echo meter is again supplied with current, but this effects no change, as the iron disk is still attracted by the first, rotary magnet. When, however, the microphone catches the returning echo wave, the current for the motor rotated magnet is switched off over an amplifier-relay arrangement to be described later on. Consequently the disk 8 is once again attracted to the fixed magnet with practically no delay whatever, thus arresting the pointer connected to the iron disk practically simultaneously with the arrival of the echo wave.

Referring to the diagram of the connections as illustrated in Fig. 3, the individual switching operations in the embodiment of the invention are carried out in the same manner as is usually done in known echo sound meters. When the measurement is to begin, contact 121, for example, is closed by hand, so that the motor 120 and magnet 134 will rotate together as well as the cam disks 184, 186, 188 by the operation of gears 128, 130 and 182. The cam disks are adjusted relatively to each other on their shaft and are timed to operate as follows:

First of all contact 180 remains closed, thus supplying current to electromagnet 144, which is a fixed magnet in known echo meters, but in accordance with the present invention is positively connected to diaphragm chambers 164. Consequently the iron disk 210 will be attracted by said magnet 144. On further rotation of the motor, however, cam 186a of disk 186 closes contact 214, thus supplying current to the winding of relay 216 through conductors 218, 220 of battery 221 and through conductor 222, through amplifier 223 and conductors 224 and 226. Consequently both armatures 228, 230 are attracted thus closing contacts 242 and 244 and contact 242 connects magnet 260 to battery 136, whereby lever arm 262 is attracted by said magnet and opens valve 168. On further rotation of the motor, however, said cam 186a releases immediately switch 214, thus breaking the circuit. Nevertheless, the winding of said relay 216 retains current, as said contact 224 had previously been closed and the current now flows from battery 221 over conductor 222, amplifier 223, conductor 224, winding 216, conductor 226, switch contact 244, and conductors 218, 220. Therefore, contact 242 also remains closed, magnets 144 and 134 continuing thus to be supplied with current. As, however, magnet 144 was first supplied with current, disk 210 remains attracted by said magnet and pointer 212 therefore remains at rest. On further rotation of the motor said cam 188a of disk 188 closes contact 208 and the circuit of the low tension detonator fuse of battery 202 over conductor 204, the low tension detonator fuse and conductor 206, whereby cartridge 200 is fired and the sound wave emitted. Simultaneously with the firing of the cartridge by cam 188a however, the spring of contact 180 falls into a slot 184a of disk 184, thus opening the contact 180 and de-energizing magnet 144. Consequently, simultaneously with the opening of said contact said iron disk 210 is attracted to said magnet 134 which is still supplied with current, so that now pointer 212 is rotated, since said magnet is positively coupled to the motor. At the same time, however, the circuit for magnet 144, just opened as above described, is reclosed by the left rim of said slot 184a, so that both magnets 144 and 134 are instantaneously supplied with current upon the emission of the sound wave and the setting in operation of pointer 212. As, however, before the magnetization of magnet 144, the magnet 134 was already supplied with current, disk 210 remains attracted by magnet 134, so that the pointer continues its movement. The returning echo wave is caught by a microphone 250, to which an amplifier 223 is so connected that the current of said microphone, influenced by the sound wave, weakens the amplifier current in consequence of its audion switching. As this current flows through winding 216 of the relay over contact 244 to battery 221, the relay's induction is so far weakened that the relay drops its armatures 228 and 230 biased by springs 252 and 254 whereby contacts 242 and 244 are broken at the same moment at which the echo wave is received by microphone 250, thus leaving the anode current in amplifier 223 interrupted, so that relay 216 remains inactive. The opening of contact 242, however, has rendered magnet 134 currentless simultaneously with the returning echo wave, so that at the same moment the iron disk is attracted to magnet 144, thus positively connecting pointer 212 with said diaphragm chambers 164. Both conductors 256, 258, leading to the winding of the magnet 260 are, however, branched off from lines 138a, 140. The armature of said magnet 260 consists of the right arm 262 of a two-armed lever, the other arm of which carries valve 168. Said valve remains open so long as said magnet 134 is supplied with current and said pointer 212 is rotated by said motor 120. Said valve will be closed by spring 264 simultaneously with the opening of contact 242 or with the returning echo wave. Consequently pointer 212 will now be adjusted by said altimeter 164 according to the altitude to be measured barometrically or, in accordance with the invention, pointer 212 indicates the altitude above ground corrected by the echo measuring means.

I am aware that my present invention may be embodied in other specific forms than those herein described without departing from the spirit or essential attributes thereof, and I therefore desire the present embodiments of said invention to be considered in all respects as illustrative and not restrictive, reference being had to the appended claims rather than to the foregoing description to indicate the scope of the invention.

I claim:

1. Apparatus of the class described comprising an aneroid diaphragm having a valve controlling communication with the atmosphere; indicating means; a constant speed rotor; motion transmission means, including a clutch mechanism selectively to connect said aneroid diaphragm and said constant speed rotor with said indicating means; means to emit a wave train; means simultaneously operable at the time of emission of the wave train to control said clutch mechanism to connect said indicating means with said constant speed rotor; means responsive to the return wave train to control said clutch mechanism to disconnect said indicating means from said constant speed rotor and connect said means with said aneroid diaphragm, said responsive means also controlling said valve to shut off communication of said aneroid diaphragm with the atmosphere.

2. Apparatus of the class described comprising, in combination, means to emit a wave train; a shaft revolving at constant speed; altitude indicator means; means rendered operative to connect said altitude indicator means to said shaft upon emission of a wave train and to disconnect it therefrom upon return of said wave train after reflection from the ground; means responsive to changes in atmospheric pressure; and means operative to connect said means responsive to changes of atmospheric pressure to said indicator means upon return of said wave train to said device after reflection from the ground.

3. Apparatus of the class described comprising, in combination, means to emit a wave train; means operated at constant speed; altitude indicator means; means rendered operative by emission of a wave train to connect said altitude indicator means to said means operated at constant speed and to disconnect said altitude indicator means from said means operated at constant speed upon return of said wave train after reflection from the ground; means responsive to changes in atmospheric pressure; and means operative to connect said means responsive to changes in atmospheric pressure to said indicator means, upon return of said wave train after reflection from the ground.

4. Apparatus of the class described comprising, in combination, means to emit a wave train; altitude indicator means; driving means adapted to drive said altitude indicator means at constant speed; means responsive to changes of atmospheric pressure; and means responsive to the return of the wave train to disconnect said altitude indicator means from said driving means and connect said altitude indicator means to said means responsive to changes in atmospheric pressure.

5. Apparatus of the class described comprising, in combination, means to emit a wave train; altitude indicator means; driving means adapted to drive said altitude indicator means at constant speed; means responsive to changes in atmospheric pressure; a clutch; means actuated on emission of a wave train to operate said clutch to connect said driving means to said altitude indicator means; and means actuated by said wave train upon its return after reflection from the ground to operate said clutch to disconnect said driving means from said altitude indicator means and to connect said altitude indicator means to said means responsive to changes in atmospheric pressure for operation by the latter.

6. Apparatus of the class described comprising, in combination, altitude indicator means; means responsive to changes in atmospheric pressure; means traveling at constant speed; a differential gearing alternatively operable by said pressure responsive means and said constant speed means and connected to actuate said indicator means; means to emit a sound wave train, said constant speed means being connected to operate the differential gearing at the instant of emission of a sound wave train; and means responsive to the return of the sound wave train to disconnect said constant speed means from and connect said pressure responsive means to said differential gearing.

7. Apparatus of the class described comprising, in combination, altitude indicator means; means responsive to changes in atmospheric pressure; means traveling at constant speed; a differential gearing alternatively operable by said pressure responsive means and said constant speed means and connected to actuate said indicator means; means to emit a sound wave train, said constant speed means being connected to operate the differential gearing at the instant of emission of a sound wave train; and means responsive to the return of the sound wave train to render the constant speed means inoperative on the differential gearing and to render the pressure responsive means operative on the differential gearing.

GUIDO WÜNSCH.